Aug. 1, 1967
P. NASH
3,334,239
PIVOTAL LIGHT-GATE FOR DETECTING SURFACE ELEVATIONS IN SHEET MATERIALS
Filed March 23, 1966
3 Sheets-Sheet 1
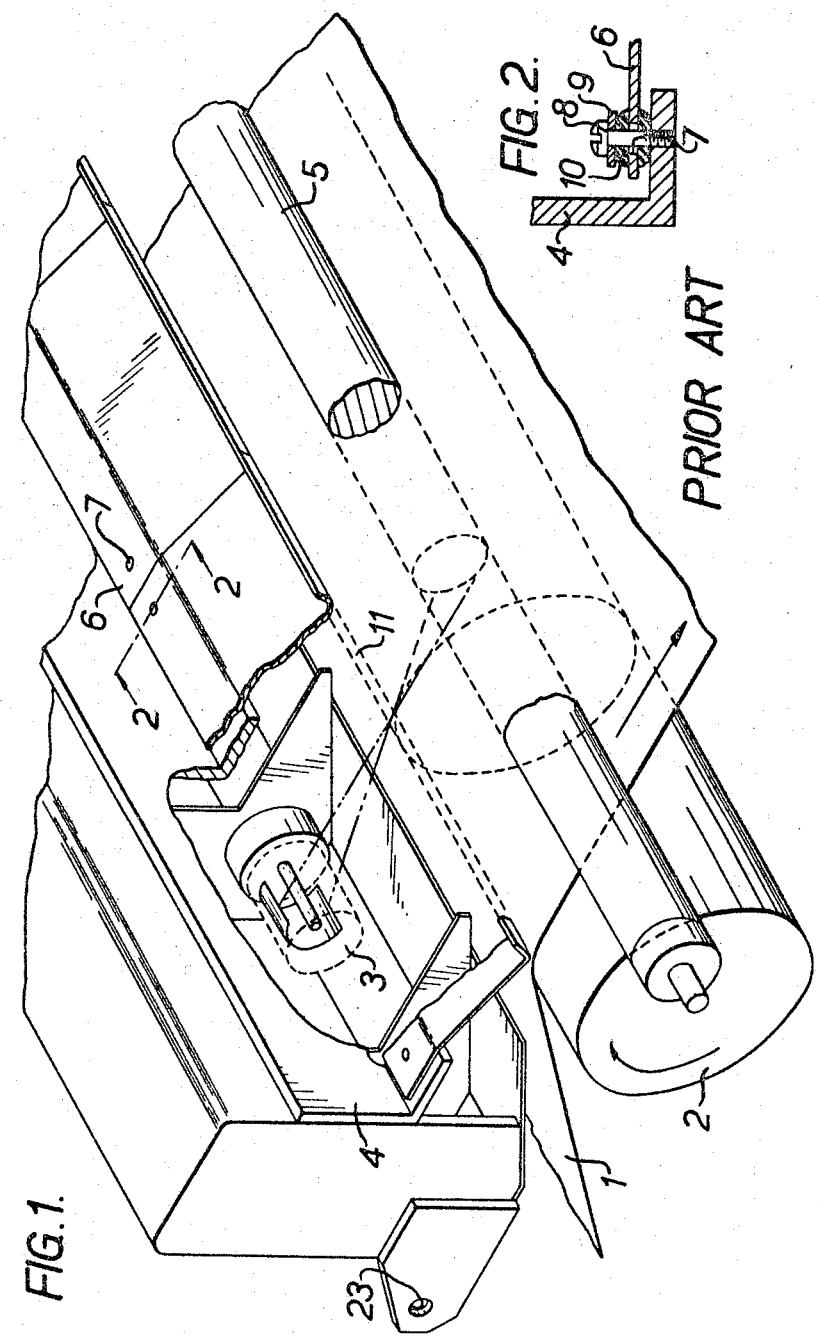
INVENTOR
PAUL NASH
By Stevens, Davis, Miller & Mosher
ATTORNEYS INVENTOR
PAUL NASH
By Stevens, Davis, Miller & Mosher
ATTORNEYS INVENTOR
PAUL NASH
By Stevens, Davis, Miller & Mosher
ATTORNEYS

United States Patent Office 3,334,239
Patented Aug. 1, 1967

3,334,239
PIVOTAL LIGHT-GATE FOR DETECTING SURFACE ELEVATIONS IN SHEET MATERIALS
Paul Nash, 1355 Wellington St., Ottawa, Ontario, Canada
Filed Mar. 23, 1966, Ser. No. 536,741
Claims priority, application Canada, June 22, 1962, 852,213
9 Claims. (Cl. 250—219)

This invention relates to improvements in the detection, by photoelectric means, of defects in moving sheet material such as paper, and is particularly concerned with improvements in the system for the detection of surface elevations disclosed in my United States Patent No. 3,105,152, issued Sept. 24, 1963.

This application is a continuation-in-part of my United States patent application No. 278,724, filed May 7, 1963, now abandoned. In said patent the basic operating principle of my system is that a light-gate member yieldingly contacts the surface of the moving sheet material with the line of contact, in the absence of any unwanted surface elevations, being continuous throughout its length and extending transversely to the direction of motion of the sheet material past the member. This light-gate member normally interrupts the transmission of light from an illumination source, which illuminates the line of contact, to photoelectric means, but yields and moves away from the surface over at least a portion of its length when a surface elevation such as a wrinkle appears at the line of contact, thereby breaking the continuous contact and permitting light from the illumination source to reach the photoelectric means which then respond by generating an output signal.

The current in a photocell is modulated simply and effectively by curving the path of the moving sheet material, over at least a portion of its length, in the direction of motion of the material, which curvature, when the light-gate member is positioned at the curved portion, will enable the light transmitted from the illumination means and passing under the light-gate member to reach the photoelectric devices by travelling in that plane tangential to the curved surface of the material passing through the line of contact between the light-gate member and the surface of the material.

As disclosed in said patent the method of resiliently mounting the light-gate member was such, that when any part of the approximately 4-inch wide plate (serving as a light-gate) was contacted and raised by an elevation, *all* parts of the gate were raised the same amount above the plane of the sheet material, i.e. the shape of the aperture or slit of the opened gate was a rectangle with parallel sides, the contact line of the raised gate being parallel to the unblemished paper surface.

This method results in uniform modulation of the photocells no matter where the location of the elevation is in relation to the position of the resilient fixing means for the gate.

However at least two resilient fixing means have to be used for each light-gate member and the alignment of the fixing means referred to in said patent and consisting of nuts, bolts and grommets was critical and required frequent attention in order to achieve the required continuous and even line of contact between the light-gate and the sheet material in the absence of an elevation. Improperly adjusted, this arrangement frequently resulted in a discontinuous line of contact in the absence of an elevation.

In particular by applying pressure to each rubber grommet to firmly close the contact line along the approximately 4-inch length of the light-gate, contact could be established but even contact could not be maintained as apparently changes in the rubber grommets' resiliency upset the alignment.

Also when only one centrally positioned rubber grommet was employed the light-gate was unworkable through lack of even pressure along the light-gate's contact line which resulted in a difference in pressure between the ends of the light-gate and a resultant lack of uniform contact.

The ideal light-gate for use in applicant's apparatus as disclosed above is obviously one which follows exactly the contours of the sheet material being inspected and which is running under the light-gate. There should be no tendency for the gate to bounce over any defect and to thereby magnify the defect's size to the sensing apparatus. Also, there should be no tendency for the light-gate to iron out any surface defects in that such ironing out can result in the lack of any response to a defect by the apparatus.

The sensitivity required of the light-gate will be appreciated when it is realized that it is often necessary in commercial installations that surface defects having a height of the order of 0.0005 of an inch be unfailingly and reliably detected on sheet material which is moving at a high speed of up to 1,200 feet per minute.

Applicant's apparatus is frequently used in manufacturing plants such as paper mills where the operating environment is far from ideal by reason of the existence frequently of dust or vibration or high humidity as well as other undesirable environmental characteristics. Also, the apparatus must be capable of operating for long periods of time often of the order of a number of months, with little and preferably no maintenance or attention. Its operation will be often almost continuous in that many of the plants wherein this form of apparatus is employed operate on a 24-hour shift basis, seven days a week. Thus the utmost in reliability is required which of course in turn requires apparatus which is as simple as possible while still being capable of satisfying the tolerance and other requirements noted above which are demanded by the purchasers of this type of inspection apparatus for sheet material such as fine papers which must not be damaged in any way by the light-gate.

It is accordingly a general object of this invention to provide a light-gate member which better meets the above-noted requirements and therefore approaches nearer to the ideal light-gate, than any other previously known form of light-gate.

More specifically, it is an object of this invention to provide a light-gate which is self-aligning in that its structure is such that under normal operating conditions and lacking continuous critical adjustment, the light-gate member tends to continuously align itself with the sheet material passing under it to achieve the required continuous line of contact, while also tracking over the surface in a much more reliable manner than heretofore known.

The novel fixing means of this invention in turn can affect said uniformity of modulation of the photocells, but according to this invention variations in the modulation efficiency as a function of defect position is kept within reasonable and tolerable limits. Also these novel fixing means necessitate modifications to the light-gate members and such modifications therefore also form part of this invention, which will now be described in conjunction with the accompanying drawings which are included by way of illustration and not of limitation, and in which like numerals refer to like parts throughout the various figures and wherein;

FIGURE 1 is a perspective view with parts broken away of a form of prior art apparatus;

FIGURE 2 is a partially sectioned view in elevation taken along the line 2—2 of FIGURE 1;

Figure 3:
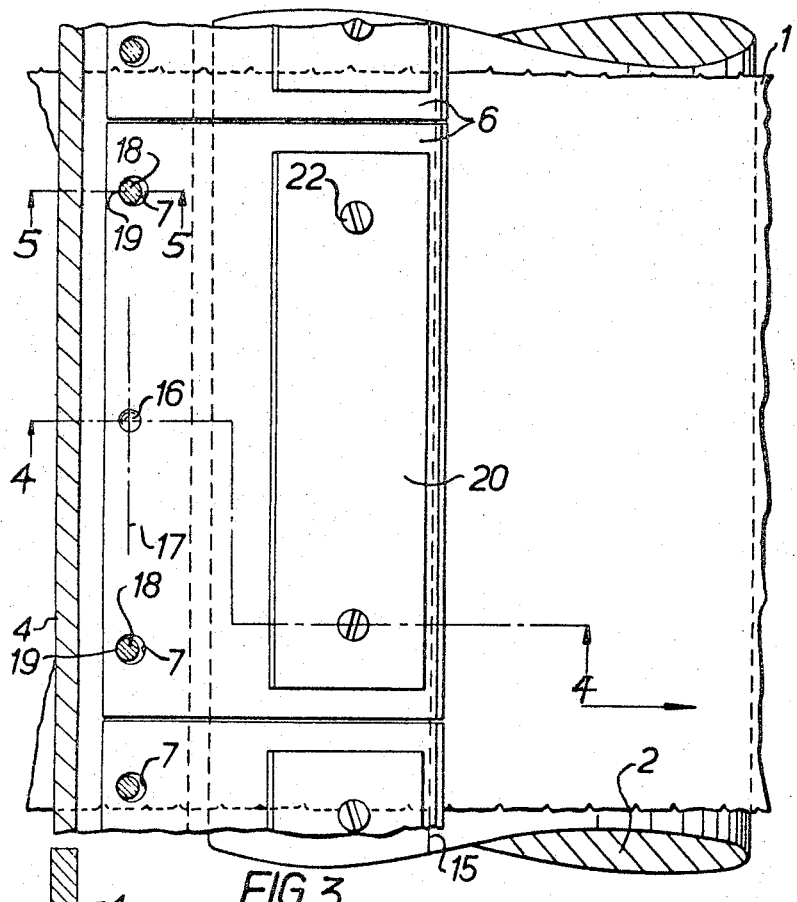
FIGURE 3 is a plan view with some parts broken away of an embodiment of the present invention.

In FIGURES 1 and 2 (prior art) sheet material 1 is drawn over roller 2. Photocell 3 in housing 4 views lamp 5 when light-gate member 6 is raised by an elevation in the sheet material 1. The two holes 7 in gate member 6 provide for the resilient mounting of each end of the gate member 6. Each mounting consists of a screw 8, a washer 9 and a rubber grommet 10; the two screws 8 have to be adjusted in order to apply fairly uniform pressure along the contact line 11, so that all parts of the contacting section of the light-gate presses fairly uniformly upon the sheet material, thus reliably closing the gate member 6 along its entire contact line. This construction has proven to be critical in use.

Figure 4:
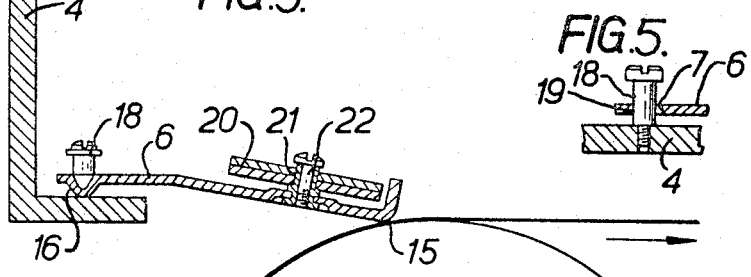
FIGURE 4 is a partly sectioned view in elevation taken along the line 4—4 of FIGURE 3.
Figure 5:
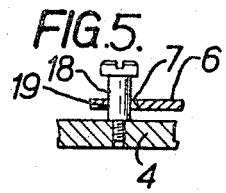
FIGURE 5 is a partly sectioned view in elevation taken along the line 5—5 of FIGURE 3.

Apparatus constructed in accordance with the present invention for supporting the light-gates 6 is shown in FIGURES 3, 4 and 5. In this embodiment the gates automatically align themselves to provide a continuous line of contact when the inspected sheet material 1 is in motion. Screws are not required for the reliable closing of the light-gates over the unblemished sheet material. Each light-gate 6 is resting on contact lines 15 and a centrally located, bulbous pivot 16. Two holes 7 are located, one adjacent each end of gate 6, approximately in line with the pivot centre line 17.

The diameter of the gate stop rods 18 formed by screws is smaller than the diameter of holes 7, so that the gates have a small amount of play in the plane of the gate. That is, a small amount of rotational movement around the pivot centre 16 can occur.

The moving paper 1 drags gate 6 in the direction of the paper flow due to friction between paper and gate so that the "stop" rods 18 contact each gate points 19 and so align the gates into the desired ideal positions, resulting in perfect closure of the light-gates. Weights in the form of plates 20 are held in position by rivets 21 and screws 22. The heads of screws 18 and 22 have larger diameters than the holes 7 in gates 6 or in plates 20, so that when the inspection head is tilted upwards (around pivot support 23 shown in FIGURE 1) to facilitate feeding the paper into the machine and over roller 2, the gates 6 and plates 20 cannot drop off the inspection head.

The plates 20 apply a uniform force upon gate-contact-line 15. By making all plates 20 identical in weight the uniform pressure by all gates at the contact line 15 is assured.

As previously noted, it is important that the gates follow truly the contours of the paper. At high paper speeds, a small bump could produce a false indication by kicking the gate upwards so that the "contact line" 15 does not make contact with the sheet material for an interval of time. Then the corresponding signal generated in the photocell is greater in amplitude and its duration is longer than the true signal which should have been generated corresponding to and proportional to the small bump. The higher the speed of the sheet material 1, the greater is the kinetic energy of the travelling elevations on the sheet material and consequently the greater are the bumping forces upon the gate. As the speed of the sheet material increases, more plates 20 are employed. The weight of plates 20, that is the gravitational force distributed evenly along the contact line 15, must be equal or greater than the bumping force opposing said gravitational force, then gates 6 will truly follow the contours of the sheet material.

The weights employed should not be much greater than necessary to satisfy said criterion of true contour detection, and the greater the weights, the greater is the wear on the gates at the contact line. In order to reduce wear on the gates the contacting surface of the gates should be made of a hard material.

There is also a tendency for hard foreign particles present in dust to embed into and adhere to the gates at their line of contact. Such particles can scratch the surface of some sheet material, such as coated papers or plastics.

Oxidized aluminum plates have been employed successfully for gates 6. The very hard oxide surface is highly polished and is kept clean by the sheet material and so pick-up of hard dust particles or excessive wear of the gates is substantially eliminated.

Figure 6:
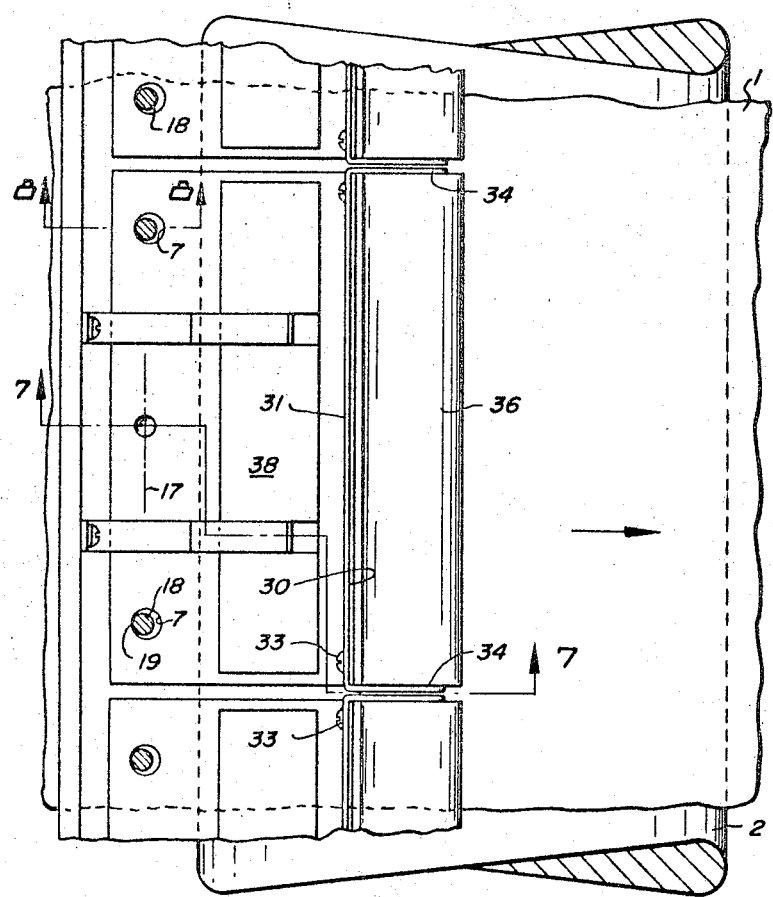
FIGURE 6 is a plan view with some parts broken away of another embodiment of the present invention which is essentially a modification of that shown in FIGURE 3.
Figures 7, 8:
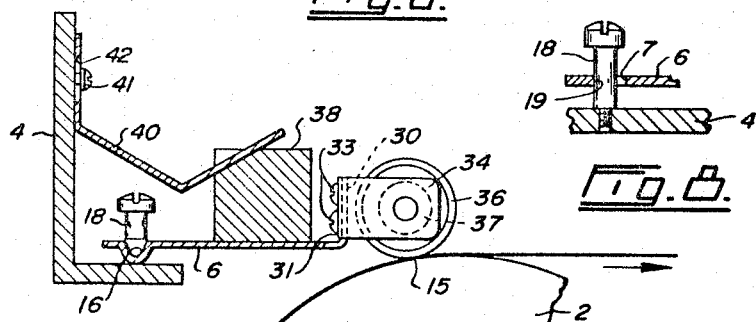
FIGURE 7 is a partly sectional view in elevation taken along the line 7—7 of FIGURE 6.
FIGURE 8 is a partly sectioned view in elevation taken along the line 8—8 of FIGURE 6.

Referring now to FIGURES 6, 7 and 8, there is shown a modification of the embodiments of FIGURES 3, 4 and 5. In this modification, wherein the light-gate 6 is mounted on housing 4 in exactly the same manner as disclosed above with respect to FIGURES 3, 4 and 5, the light-gate 6 is modified so as to have a transverse cross section in the form of an ⌐ including an upstanding leg 30. A substantially U-shaped bracket 31 is secured to leg 30 by screws 33. Between the pair of parallel legs 34 of the U-shaped bracket 31, there is mounted a precision ground roller 36 which rotates on precision ball bearings 37 which are, of course, in turn mounted on the legs 34, there being one ball bearing 37 at each end of the roller 36. The roller must be capable of high-speed rotation for long periods of time with little play resulting. Thus in this embodiment the contact line 15 is in fact a roller contact between the sheet material 1 and the roller 36.

The weight 20 in FIGURE 4 is replaced in this embodiment by a foamed plastic rectangular block 38 of substantially square cross section, the block 38 being adhesively secured to the gate 6. Variable pressure may be applied on block 38, one of which is provided on each of the light-gates 6, by means of presser feet 40 which are adjustably mounted on housing 4 by means of a machine screw 41 which passes through a vertical slot 42 in foot 40 and is threaded into the housing 4. Thus, the pressure of the light-gate 6 at its contact line 15 on the sheet material 1 is controlled by vertically adjusting the presser foot 40 which acts through the intermediary of the block 38. Block 38 functions quite simply and reliably as a dampening member to prevent unwanted vibration and oscillation of the gate 6 when it passes over a surface irregularity in the sheet material being inspected.

While for convenience of description, two rather narrow presser feet 40 are shown, it is preferable to use one long presser foot which will better distribute pressure over the block 38. In fact a single long presser foot may extend over several blocks on several light-gates.

In summary, there is provided a simple, yet very reliable light-gate for use in surface defect detecting apparatus with such a light-gate being capable of uninterrupted use over extended periods of time with little, if any, maintenance or attention, while reliably detecting defects in fast-moving sheet material, the defects often being as small as 0.0005 of an inch.

I claim:

1. In apparatus for detecting surface elevations such as wrinkles in moving sheets of normally smooth surfaced material, such as paper, said apparatus including a light-gate yieldingly engageable with a surface of said moving sheet material along a line of contact between said surface and said gate in the absence of any unwanted surface elevations, the line of contact extending in a direction transverse to the direction of motion of said sheet material, light-gate supporting means and mounting means for securing said light-gate to said light-gate supporting means, the improvement comprising pivotal light-gate mounting means which permit said light-gate to continuously self-align itself with said moving surface with which it is in contact during operation of said apparatus so as to render and maintain the line of contact continuous throughout its length in the absence of any of said elevations to provide perfect closing of the light-gate, the mounting means consisting of pivot means pivotally supporting said light-gate member on said support, said pivot means being located substantially midway between the ends of said light-gate and adjacent the side edge remote from the side edge adjacent its contact line so that said light-gate during operation of said apparatus rests on said pivot means and said sheet material at said contact line, stop means for limiting rotational movement of said gate in its plane, said stop means being located substantially on a straight line parallel to said line of contact, the fit between said stop means and said light-gate being loose to permit self-aligning movement of said gate during operation of said apparatus, and means on said light-gate for exerting manually adjustable pressure on said sheet material at said contact line.

2. Apparatus according to claim 1 wherein said straight line passes through the centre of said pivot means.

3. Apparatus according to claim 1 wherein said pivot means consists of a pivot point formed in said light-gate and pivotally contacting a surface of said light-gate supporting means.

4. Apparatus according to claim 1 wherein said stop means consists of a pair of substantially vertical rods secured to said supporting means and passing through apertures in said light-gate, the diameter of said apertures being greater than that of said rods, the centre of said apertures being on said straight line.

5. Apparatus according to claim 1 wherein said pressure exerting means consists of a manually variable weight located on said light-gate between said pivot means and said contact line.

6. Apparatus according to claim 1 wherein the pressure exerting means consists of a block of resilient material characterized by its ability to absorb abrupt mechanical pressure to thereby dampen movement of said light-gate, and adjustable presser means for applying pressure to said block which pressure is transmitted through said block to said light-gate.

7. Apparatus according to claim 6 wherein said block is secured to said light-gate between said pivot means and said contact line, and said presser means consists of a presser foot secured to said light-gate supporting means so as to press on said block.

8. Apparatus according to claim 1 wherein said contact line is provided by a roller bearing mounted roller forming part of said light-gate.

9. Apparatus according to claim 7 wherein said contact line is provided by a roller bearing mounted roller forming part of said light-gate.

References Cited
UNITED STATES PATENTS 3,105,152 9/1963 Nash _____ 250—219
3,206,606 9/1965 Burgo et al. _____ 250—219

RALPH G. NILSON, *Primary Examiner.*

JESSE D. WALL, *Assistant Examiner.*